Figure 1:
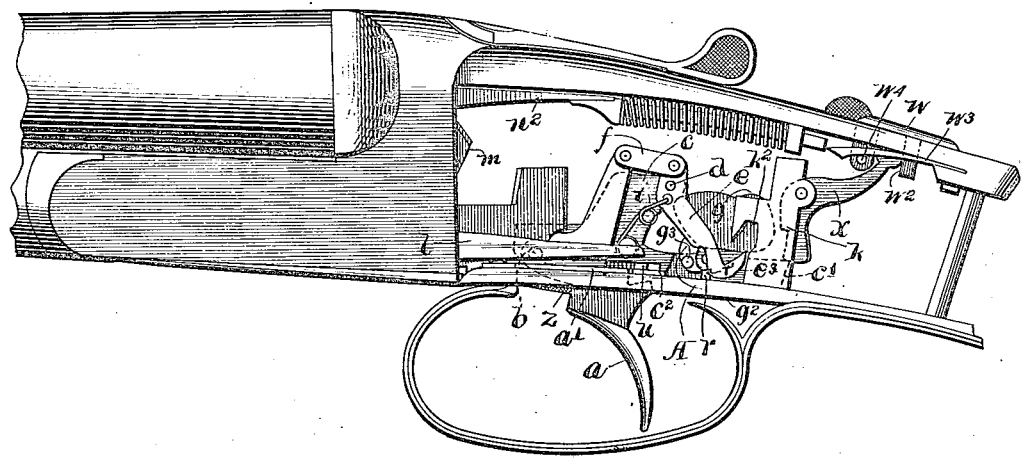

No. 747,191. PATENTED DEC. 15, 1903.
A. E. LARD.
SINGLE TRIGGER FIREARM.
APPLICATION FILED DEC. 4, 1901.
NO MODEL. 3 SHEETS—SHEET 1.

Witnesses:
Carl M. Crawford
William H. Hall

Inventor:
Allan E. Lard
by Poole & Brown
his Attorneys

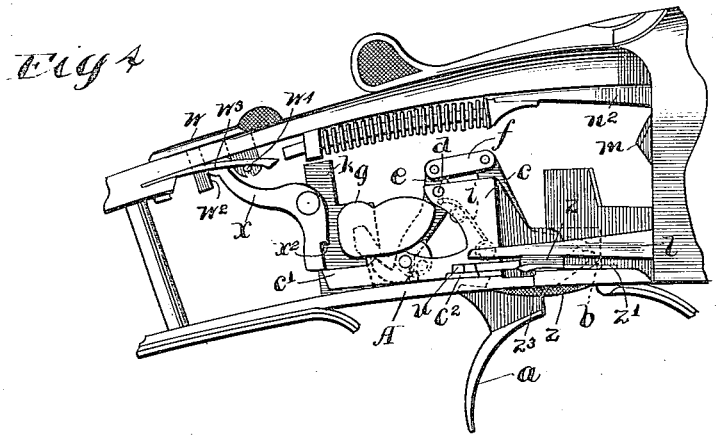
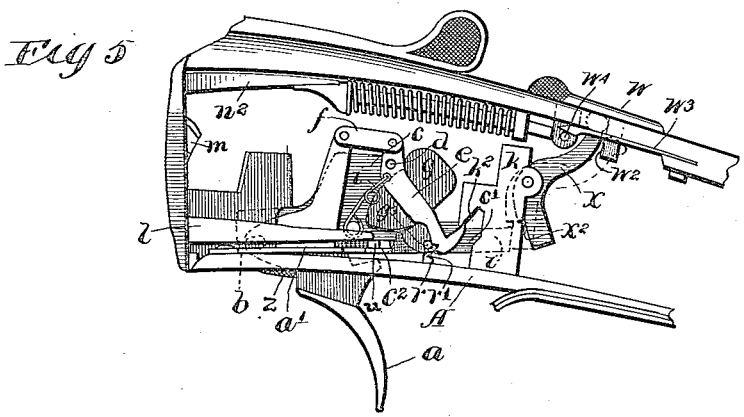
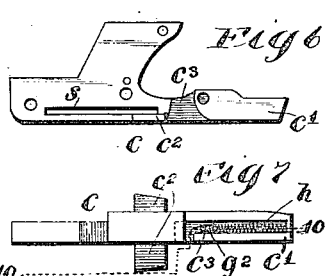
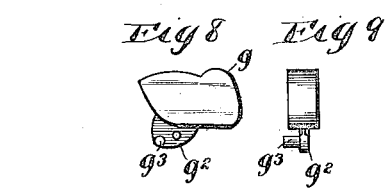
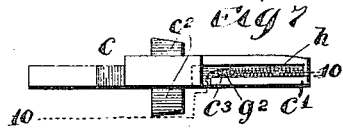
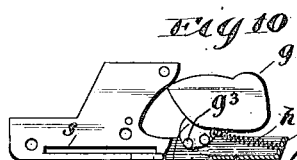

No. 747,191. PATENTED DEC. 15, 1903.
A. E. LARD.
SINGLE TRIGGER FIREARM.
APPLICATION FILED DEC. 4, 1901.
NO MODEL. 3 SHEETS—SHEET 3.
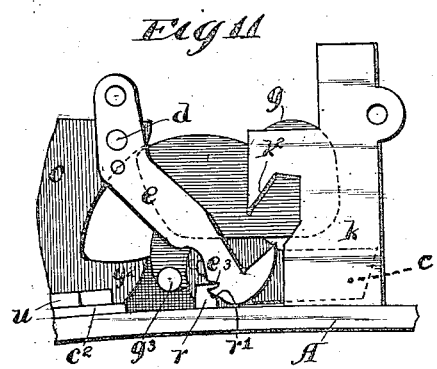
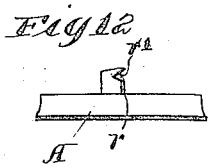
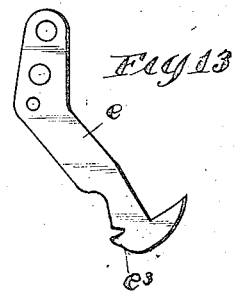
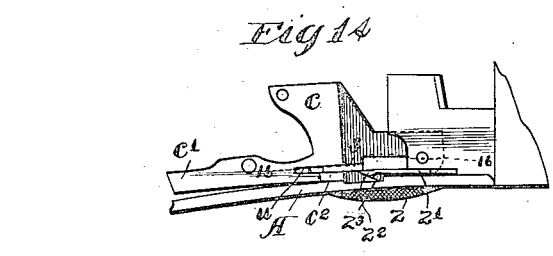
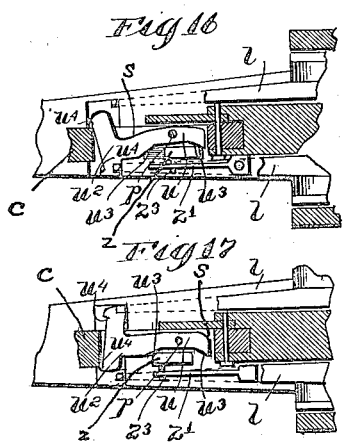
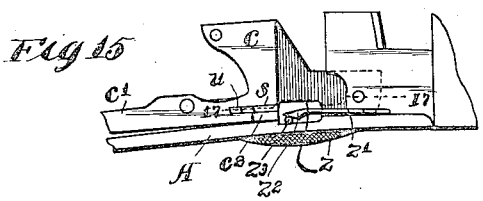
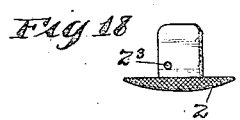
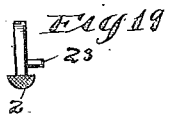
Witnesses:—
Carl M. Crawford
William L. Hall
Inventor:—
Allan E. Lard
by Poole & Brown
his Attorneys No. 747,191.

Patented December 15, 1903.

UNITED STATES PATENT OFFICE.

ALLAN EDWARD LARD, OF ST. JOSEPH, MISSOURI.

SINGLE-TRIGGER FIREARM.

SPECIFICATION forming part of Letters Patent No. 747,191, dated December 15, 1903.

Application filed December 4, 1901. Serial No. 84,651. (No model.)

*To all whom it may concern:*

Be it known that I, ALLAN EDWARD LARD, of St. Joseph, in the county of Buchanan and State of Missouri, have invented certain new and useful Improvements in Firearms; and I do hereby declare that the following is a full, clear, and exact description thereof, reference being had to the accompanying drawings, and to the letters of reference marked thereon, which form a part of this specification.

This invention relates to firing mechanism for firearms of that class set forth in my prior United States Letters Patent, No. 636,050, dated October 31, 1899, wherein a single trigger is used to fire a plurality of barrels.

The present invention embraces certain improvements in firing mechanisms of the kind referred to.

One object of the present invention is to provide means by which a very light triggerspring may be employed, thereby obtaining a lighter trigger pull without liability of a double discharge or the firing of a second barrel when the trigger is pulled in the discharge of the first barrel and by which a gun equipped with a non-automatic safety device will be prevented from being discharged by the jarring of the firing mechanism when the barrels are suddenly and forcibly closed after loading.

Other objects of the present invention are to provide an improved construction in safety devices adapted to hold the firing mechanism from action, to provide an improved selective or reversing device whereby either barrel may be fired first in the pulling of the trigger, as desired by the user of the gun, and to avoid the necessity of using resetting devices operated in the act of reloading the arm, such as are shown in said prior patent, No. 636,050.

The invention is herein shown in connection with a shotgun which is provided with two shot-barrels and locks or firing mechanism embracing two hammers, together with means for actuating the same by successive pulls on a single trigger. The invention may, however, be applied to firearms of other kinds and to those having more than two barrels.

Figure 2:
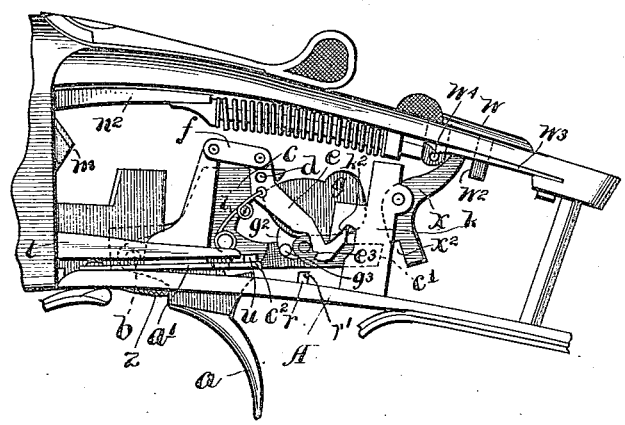
Figure 3:
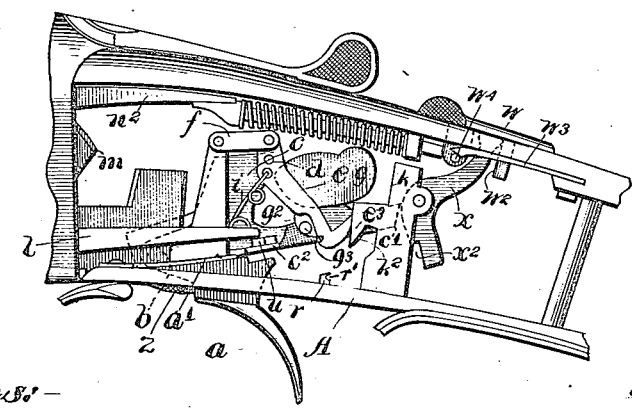

In the accompanying drawings, illustrating my invention, Figure 1 is a view in side elevation of the breech mechanism of a double-barreled shotgun made in accordance with my invention, illustrating the position of the parts after the cocking of the hammer and before the trigger is pulled to release the said hammer. Fig. 2 is a similar view showing the position of the parts after the trigger has been pulled to fire the first barrel. Fig. 3 is a similar view showing the position of the parts after the discharge of the second barrel. Fig. 4 is a view in side elevation, showing the side of the breech mechanism opposite that shown in Figs. 1, 2, and 3, with the parts in the position shown in Fig. 1 or in the position which they occupy before the firing of the first barrel. Fig. 5 is a view similar to Fig. 2, showing the changed position of the weight due to the recoil. Fig. 6 is a side elevation of the firing-plate detached from the other parts. Fig. 7 is a plan view of the same. Fig. 8 is a side elevation of the pivoted weight. Fig. 9 is an end elevation of the same. Fig. 10 is a view, partly in side elevation and partly in longitudinal vertical section, taken on line 10 10 of Fig. 7, of the firing-plate with the pivoted weight in position thereon. Fig. 11 is an enlarged detail side elevation of the spur-lever and check-stud, illustrating the position of these parts prior to the firing of the first barrel when the said spur-lever is engaged with the said check-stud. Fig. 12 is a detail side view of the check-stud. Fig. 13 is a detail side elevation of the spur-lever. Fig. 14 is a detail side elevation of the firingplate, together with the reversal or selective device associated therewith to enable either barrel to be fired first. Fig. 15 is a similar view showing a changed position of the parts. Fig. 16 is a sectional detail plan view of the parts shown in Figs. 14 and 15, taken on the section-line 16 16 of Fig. 14. Fig. 17 is a similar view of the same parts, taken upon the section-line 17 17 of Fig. 15. Fig. 18 is a side view of the slide or button by which the selective device shown in Figs. 14 to 17 is operated. Fig. 19 is an end view of the same. Fig. 20 is a side elevation of a modified form of the slide or button shown in Figs. 18 and 19.

As shown in said drawings, *a* is the trigger, which is pivoted by a pivot *b* to the triggerplate A, and *a'* is the trigger-spring.

$c$ is the firing-plate, (shown separately in Figs. 6, 7, and 10,) which is pivoted on the same pivot-pin $b$ as the trigger $a$ and is raised by the action of the trigger in the firing of the gun. To the upper and rear part of the firing-plate $c$ is pivoted a spur-lever $e$ by means of a pivot-pin $d$. The upper end of said spur-lever is connected to an upwardly-extending arm of the trigger $a$ by a short link $f$. The spur $e'$ of the spur-lever $e$ projects rearwardly and is adapted to engage a projection $k^2$ on a locking-post $k$, which rises from the trigger-plate A. The lower arm of the spur-lever $e$ is connected by a light wire spring $i$ with the lower arm of the firing-plate $c$, so that when the trigger $a$ has been moved by the pull thereon and the firing-plate $c$ and the spur-lever $e$ thereby raised, as represented in Fig. 2, the spur-lever $e$ will on the release of the trigger $a$ move forward and drop upon the check-stud $r$. The check-stud $r$ is located on the trigger-plate, and besides holding the spur-lever in an elevated position after the first barrel is fired forms part of a device for preventing the premature firing of the first or second barrel when a light trigger-spring is used and also constitutes a means by which the use of a resetting device for restoring the parts to their initial position and operated by the breaking of the gun in the act of reloading may be dispensed with.

The firing-plate $c$ is provided with two lateral flanges $c^2$, extending beneath the sears $l\,l$, and is also provided with a shifting selective or reversing lever $u$, which operates in conjunction with the said flanges $c^2$ to effect the firing of the barrels in succession as the firing-plate is lifted and which enables either barrel to be fired first.

$m$ indicates the hammers of the locks or striking mechanisms.

The firing-plate $c$ is provided with a lower rearwardly-projecting arm $c'$, and in said arm $c'$ is formed a longitudinal slot $c^3$, in which is pivoted a lever $g$, weighted at its upper part, the said lever having a downwardly-projecting arm $g^2$, which on the recoil of the gun moves in said slot, the weight at such time taking the position shown in Fig. 5. The lower arm $g^2$ of the weight-lever $g$ has a horizontal pin or projection $g^3$, which comes against the lower arm of the spur-lever $e$ when the said weight takes the position represented in Fig. 5, thereby blocking the involuntary pull. The said weight-lever $g$ is kept in the position represented in Fig. 1 by a light coiled spring $h$, occupying a box-like longitudinal recess in the lower arm $c'$ of the firing-plate $c$, as clearly shown in Figs. 7 and 10.

When the first sear is lifted, the parts are in the position shown in Fig. 2. The lever $e$ under the action of its spring now begins to escape from under the hook $k^2$; but the recoil drives the upper end of the weight-lever $g$ forward, thus causing its lower end to strike the spur-lever $e$ a hammer-like blow, which drives said lever $e$ back under the hook $k^2$. The spur-lever $e$ now begins to escape from the hook $k^2$ a second time; but the rebound of the gun from the shoulder in conjunction with the tension of the muscles causes the upper end of the weight-lever $g$ to again swing forward and the lower end of the said lever $g$ to again strike the spur-lever $e$, but with less force than before, thus causing said spur-lever $e$ to descend to its lowermost position, as shown in Fig. 1. When the gun is held properly and fired in the usual manner, the second action of the weight-lever $g$ takes place during the involuntary pull and is unnecessary and ineffective; but when the gun is held loosely or far from the shoulder the second action takes place before the involuntary pull and is both necessary and effective in the blocking of the involuntary pull. However, if a light charge is used and the gun is held tightly and firmly the first action of the weight-lever $g$ will cause the spur-lever $e$ to descend to its lowermost position, the recoil being insufficient to drive it farther. Thus it will be seen that the position which the spur-lever $e$ occupies at the time the involuntary pull occurs depends upon the manner in which the gun is held and upon the charge used.

Now referring to those features of construction whereby I am enabled to use a light trigger-spring without liability of the second barrel being prematurely fired I place on the trigger-plate the check-stud $r$, hereinbefore referred to, and so construct the parts that a positive engagement is afforded between the spur-lever $e$ and the said check-stud $r$ at the time the parts are in the position shown in Fig. 1. Such positive engagement of the spur-lever $e$ with the stud $r$ is affected by the employment of a notch $r'$ in the stud $r$ and a tooth $e^3$ on the spur-lever $e$, these parts constituting two detents and being adapted for interlocking engagement when the spur-lever $e$ is in its lowermost position, as clearly seen in Fig. 1. The engaging surfaces of the tooth $e^3$ and the notch $r'$ are, moreover, so arranged, as seen in Fig. 11, as to enable the lower end of the spur-lever $e$ to swing freely backward on its pivot in the preliminary part of the trigger pull while at the same time to prevent the rear end of the firing-plate $c$ being jarred up. It follows that the interlocking connection of the said spur-lever $e$ with the stud $r$ will not at all interfere with the normal action of the spur-lever $e$ when the first sear is lifted, while at the same time no rising of the firing-plate $c$ will occur until after pressure has been applied to the trigger $a$ and the same has been moved sufficiently to effect the disengagement of said spur-lever $e$ from said stud $r$.

I have found in the device shown in my prior patent, hereinbefore referred to, when the gun is equipped with a very light trigger-spring and the parts have been carried by the recoil to their lowermost position, as seen in Fig. 1, that the impact of the gun with the shoulder as it recoils has a tendency to jar the firing-plate $c$ up, thus lifting the spur-lever $e$ up on the check-stud $r$, and consequently out of its holding position. Should the impact of the trigger and firing-finger occur as the gun rebounds after this escape of the spur-lever $e$ from the check-stud $r$ a premature discharge of the second barrel would occur. While I have been able to overcome this tendency by the use of a trigger-spring of a proper strength or stiffness, yet this is not always desirable, as a very light pull is often required, and by the construction herein described—that is to say, by the provision of interlocking or engaging parts on the lower end of the spur-lever $e$ and on the check-stud $r$, the spur-lever $e$ and check-stud $r$ are positively engaged when the recoil in firing the first barrel has carried the spur-lever $e$ to its lowermost position, as shown in Fig. 1. When the parts are in the position shown in that figure, the firing-plate $c$ cannot rise until pressure is applied to the trigger, as before stated. It will also be seen that the tendency of the firing-plate to fly up and lift the sear in closing the gun after loading is likewise overcome, so that premature firing of the first barrel is rendered entirely impossible.

To avoid the necessity of using means operated through the opening of the gun in loading to reset the spur-lever $e$—that is, bring the parts back to their initial position—after firing—such, for instance, as the resetting-rod H, (shown in my said prior patent, No. 636,050,)—I provide the stud $r$ with a top surface arranged at such an angle as to prevent the spur-lever $e$ from sliding rearwardly off of said stud $r$ under the action of the trigger-spring, while at the same time having such inclination that when the gun is broken for loading the pressure of one or the other of the sears on one of the flanges $c^2$ of the firing-plate $c$ (or on the cross-head of the reversal lever) causes the spur-lever $e$ to slide rearwardly off of the check-stud $r$, thereby bringing it into a position at the rear of said stud $r$, with its point or spur $e'$ below the projection $k^2$, as shown in Fig. 1. This construction in the check-stud $r$ not only enables the said resetting-rod to be dispensed with, but enables the weight-lever $g$ to be made smaller without any lessening of the effectiveness of its operation.

In Fig. 1 is shown the position of the parts when both barrels are charged and the gun is ready for firing. Upon the trigger being pulled the spur-lever $e$ is disengaged from the stud $r$ and the first sear is lifted; but the movement of the firing-plate $c$ is arrested before contact with the second sear occurs by engagement of the spur-lever $e$ with the tooth $k^2$, as shown in Fig. 2. The action of the weight-lever $g$ under the effect of the recoil causes the parts to assume or begin to assume their lowermost holding or interlocking positions, as shown in Fig. 1. When the gun strikes the shoulder, it rebounds therefrom and the trigger is thrown against the operator's finger; but as the parts are then in their holding position (it being understood that by "holding position" is meant any position of the spur-lever $e$ in which the spur or any portion thereof is under or beneath the hook or tooth $k^2$) or on their way to their position for engagement of the spur-lever $e$ with the stud $r$ contact of the firing-plate $c$ with the second sear is prevented by the spur-lever $e$ striking the said tooth $k^2$, and should the spur-lever $e$ reach its extreme lowermost position in the rebound of the gun from the shoulder jarring up of the firing-plate $c$ is prevented by the interlocking engagement of the spur-lever $e$ with the said stud $r$, it being readily seen that in the absence of interlocking parts on the spur-lever $e$ and stud $r$ the said spur-lever $e$ under these conditions might be jarred up over and rest on the stud $r$ and that it would then be free from the tooth $k^2$. Manifestly the particular position that the spur-lever $e$ occupies when the impact of the trigger against the finger occurs depends entirely upon the manner in which the gun is fired and the amount and kind of powder used, it being found that the farther the gun is held from the shoulder when the first barrel is fired the greater the amount of time which elapses between the contact of the gun with the shoulder and the subsequent impact of the trigger with the operator's finger in the rebound (commonly called the "involuntary pull") and that if the gun be held at a considerable distance from the shoulder there will be time enough for the spur-lever $e$ to move when jarred by contact of the gun with the shoulder from its extreme lowermost position to a position on top of the stud $r$, and therefore free from the tooth $k^2$ before the impact of the trigger with the finger and consequent involuntary pull. It follows that if there were no interlocking engagement between the spur-lever $e$ and the stud $r$ if the gun should be so held in firing as to give time for the spur-lever $e$ to jar from beneath the spur $k^2$ and upon the top of the stud $r$ the second barrel might be fired by the involuntary pull; but in the construction hereinbefore described the spur-lever $e$ is thrown into its holding position by the action of the weight-lever $g$ in the recoil when the first barrel is fired, and if after release of the pressure of the finger on the trigger through the recoil and before the subsequent impact of the trigger with the finger in the rebound of the gun from the shoulder the spur-lever $e$ has time to reach its lowermost position it will become interlocked with the stud $r$, but will be again released from the said stud $r$ and thrown back under the tooth $k^2$ when the impact of the trigger with the finger and consequent involuntary pull occurs. It follows that, no matter how great the jar or how great the length of time that elapses between contact of the gun with the shoulder and the involuntary pull, the spur-lever $e$ will at no instant be free both from the tooth $k^2$ and the stud $r$ until after the involuntary pull has occurred and pressure on the trigger released, after which the spur-lever $e$ swings to its position on top of the stud $r$ and the parts are in position for firing the second barrel. If the trigger be now again pulled, the second sear will be actuated and the second barrel fired, as shown in Fig. 3. When the gun is opened for loading and the locks are thereby set or cocked, downward pressure of one of the sears on the firing-plate $c$ acts to depress the same and thereby press the lower end of the spur-lever $e$ downwardly against the check-stud $r$, with the effect, owing to the angle or inclination of the top surface of the said stud and spur-lever, that the said lower end of the spur-lever $e$ will slip rearwardly off of the stud $r$ and fall behind the same or into the position shown in Fig. 1. The spur-lever $e$ will then come into interlocking engagement with the stud $r$, as hereinbefore described.

The interlocking connection described between the stud $r$ and the spur-lever $e$ not only prevents possibility of the second barrel being fired under the circumstances hereinbefore referred to, but also in a gun provided with a non-automatic safety device will prevent the firing of the first barrel through movement of the firing-plate $c$, due to the jarring of the same when the barrels are suddenly and forcibly closed in the act of loading the arm. When a strong or heavy trigger-spring is employed, this is not likely to occur, but it may occur when a very light trigger-spring is used in order to obtain a very light pull. The spur-lever $e$, operating in connection with the hook $k^2$ and the notched stud $r$ in the manner described, obviously constitutes an arrangement by which the movement of the firing-plate $c$ is controlled.

To now describe the safety mechanism employed to lock the firing-plate $c$ from movement the same is constructed as follows: $w$ is a tang-slide on the under side of which is formed a notch $w^2$. $x$ is an angular or bell-crank lever, the upper arm of which engages the said notch $w^2$. Said bell-crank lever is pivoted on the locking-post $k$. The lower arm of the lever $x$ is located in position to swing over the arm $c'$ of the firing-plate $c$ in one position of said lever or when its upper end is drawn backward by the shifting of the slide $w$. Said lower arm of the lever $x$ in the "safe" position of said slide $w$ is approximately vertical, as will be seen in Figs. 1 and 4, and when both hammers are cocked the end of the vertical arm of the lever overhangs and engages with the rear end of the rearwardly-projecting arm $c'$ on said firing-plate, as seen in Figs. 1 and 4, thereby preventing the firing-plate $c$ from being raised until the slide $w$ has been moved from its safe position. When one of the barrels has been discharged, if the safety-slide $w$ be moved into its safe position, further upward movement of the firing-plate $c$ is prevented by means of a shoulder $x^2$, near the end of the vertical arm of the lever $x$, which shoulder is arranged to overhang the end of the partially-raised firing-plate $c$ when the spur-lever $e$ is resting on the check-stud $r$. When the safety-slide $w$ is moved forward, so as to permit of the firing of the gun, the vertical arm of the bell-crank lever $x$ is moved backward, so as to clear the rear or tail end of the arm $c'$ on the firing-plate $c$, as illustrated in Figs. 2 and 3, at which time the firing-plate $c$ will be free to rise on the pulling of the trigger. The safety-slide $w$ is retained in one or the other of its two positions by a plate-spring $w^3$, provided with a V-shaped end adapted to bear on a horizontal pin $w^4$, which projects laterally from the slide $w$.

When the safety mechanism is arranged for automatic operation, or, in other words, so that its slide $w$ will be pushed into its safe position on the opening of the gun, I employ the usual sliding bolt $n^2$ to effect the the pushing back of the said slide $w$ through the turning of the thumb-lever. Manifestly the safety mechanism hereinbefore described is applicable to the single-trigger firing mechanism shown in my prior patent hereinbefore referred to and other like devices, as well as to the particular form of firing mechanism hereinbefore illustrated.

To now describe the reversing mechanism or selective device, which permits the firing of either barrel first, the same is constructed as follows: On the trigger-plate A is arranged a slide or button $z$, having an arm or shank which extends upwardly through a slot in said trigger-plate and is adapted to slide backwardly and forwardly therein. In the firing-plate $c$, at the level of the top of the flanges $c^2$, is formed a horizontal slot $s$, in which is pivoted on a vertical pivot-pin $p$ a T-shaped reversing-lever $u$, the widened end or cross-head $u^2$ of which is adapted to swing laterally over the flanges $c^2$ of the plate $c$. One or the other of the laterally-projecting arms of the cross-head $u^2$ of said lever $u$ is arranged to extend over one or the other of the flanges $c^2 c^2$. On the side of the said lever $u$ adjacent to the slide $z$ are formed the two cam-surfaces $u^3 u^3$, which are arranged at opposite inclinations, one forward of and the other at the rear of the pivot-pin $p$ for the lever $u$, and are adapted for engagement by the upper end of the stem of said slide. When the slide or button $z$ is moved backwardly or forwardly, its arm acts upon one or the other of the inclined or cam surfaces or shoulders $u^3 u^3$ to move or swing the cross-head $u^2$ either to the right or left, as desired. When the slide $z$ is pushed forwardly, the cross-head $u^2$ will be thrown toward the right, and when the slide is pushed backwardly said cross-head $u^2$ will be thrown to the left. By moving the slide, therefore, the said cross-head is brought over one or the other of the flanges $c^2 c^2$, which flanges are located under the ends of the sears $ll$, and thereby fills the space between one of the flanges and the sear over it, so that when the trigger is pulled the flange $c^2$ of the firing-plate $c$ acts through one arm of the crosshead $u^2$ on the sear of the barrel which is to be fired first. When the trigger is pulled to fire the second barrel, that sear is lifted by contact with the flange itself, as shown in Figs. 16 and 17. Fig. 16 shows the slide $z$ moved forward to fire the right-hand barrel first, and Fig. 17 shows the slide moved backward to fire the left-hand barrel first. The slide $z$ in each instance as it is moved strikes one or the other of the inclined shoulders $u^3$ $u^3$ and turns the lever $u$ on its pivot. The movement of the lever $u$ laterally is arrested or limited by shoulders $u^4 u^4$ on opposite ends of the cross-head $u^2$, said shoulders being arranged to come into contact with the sides of the firing-plate $c$, as clearly shown in Figs. 16 and 17. In order to retain the slide $z$ in one or the other of its two positions, a spring $z'$, having an angular head $z^2$, is arranged to bear on one side or the other of a lateral pin $z^3$, located on the shank of the slide above the trigger-plate, as shown in Figs. 14 and 15.

Fig. 20 shows a modified form of the slide $z$, wherein the same is provided with a horizontal arm $z^4$, which extends rearwardly from the shank of the slide and is provided at its end with a bulb or matted surface, this construction enabling the part of the slide intended to be engaged by the finger to be placed in any desired location on the triggerplate, it being obvious that the arm $z^4$ may extend either forwardly or rearwardly from the shank of the slide and may be of any length desired. The advantage of the form of device for reversing the order of firing herein shown is that the raising or lowering of the firing-plate $c$ has no effect on the lever $u$ or the shank of the slide $z$, which engages the same, it being obvious that the vertical inner face of said shank of the slide rests against the side edge of the lever $u$ in both positions of the slide. Furthermore, it manifestly makes no difference whether the slide $z$ be arranged to move a greater or less distance, provided that it shall pass over and act upon the cam-surfaces $u^3$ when shifted, so that no great care is required in adjusting the slide $z$ so far as its length of movement is concerned. At the same time the slide arranged as described always holds the reversing-lever firmly in either its right or left hand position.

I claim as my invention—

1. A single-trigger firing mechanism for a multiple-barrel firearm, embracing a firing-plate, means acting to arrest the movement of the firing-plate after the firing of the first barrel, means acting to permit further movement of said firing-plate for firing the second barrel, and locking means disengaged by movement of the trigger in pulling, and acting to prevent the actuation of the firing-plate through the effect of jar or impact.

2. A single-trigger firing mechanism for multiple-barrel guns, embracing a firing-plate, a trigger, and detents one of which acts to hold the firing-plate from accidental movement before the firing of the first barrel and the other of said detents acting to block the firing movement of the said firing-plate after the firing of the first barrel.

3. The combination with a plurality of locks, of a single trigger, a firing-plate, a detent pivoted to the firing-plate and connected with the trigger, a projection which is engaged by the detent to arrest the movement of the firing-plate after the firing of the first barrel, and a stud having interlocking engagement with the detent when the latter is in its initial position acting to hold the firing-plate from accidental rising, said detent when disengaged from said stud by the pulling of the trigger in firing the first barrel, being thrown into position for contact with the said projection.

4. The combination with a plurality of locks, a firing-plate and a single trigger, of means acting to control the movement of the firing-plate to prevent the second barrel being fired when the trigger is pulled for firing the first barrel and also by the involuntary pull, and means operated by the recoil acting to bring the parts into engaging relation in such a manner that they will remain engaged and prevent the firing of the second barrel in the recoil of the gun, regardless of time and jar, until disengaged by the involuntary pull, whereby said involuntary pull will be always blocked when impact of the trigger with the firing-finger occurs.

5. The combination with a plurality of locks, a firing-plate and a single trigger, of a detent pivoted to the firing-plate, and connected with the trigger, a projection on the frame for engagement with said detent after the firing of the first barrel, a pivoted weight which acts in the recoil to throw the detent into its holding position, and a stud on the frame for interlocking engagement with the said detent to hold the firing-plate from rising, whereby the pulling of the trigger for firing the first barrel will release the detent from the stud.

6. The combination with a plurality of locks, of a single trigger, a firing-plate which acts successively upon the sears of said locks, a detent which controls the movement of the firing-plate, and means operated by the pressure on the firing-plate of one of the sears in the act of setting or cocking the locks, operating to bring the parts back to their initial position.

7. The combination with a plurality of locks, of a single trigger, a firing-plate, a detent pivoted to the firing-plate and connected with the trigger, a projection which engages the detent, to arrest the movement of the firing-plate after firing the first barrel, and a stud located in position to engage the detent when in its retracted or releasing position, the top surface of said stud being inclined whereby the detent will slip therefrom into its lowermost position when the firing-plate is depressed by one of the sears in setting or cocking the locks.

8. The combination with a single trigger, a firing-plate which moves with but has a movement relative to the trigger, a detent pivoted to the firing-plate and connected with the trigger, a post which engages the detent to arrest the movement of the firing-plate after firing the first barrel, a movable weight operated by the recoil and acting on said detent to retain the same in its holding position during the involuntary pull on the trigger, a tang safety-slide and a pivoted lever one end of which is operated by the safety-slide and the other end of which is swung into or out of the path of the firing-plate when the safety-slide is shifted.

9. The combination with a single trigger and a firing-plate, of a tang safety-slide, and a pivoted lever, the upper arm of which engages the slide and the lower arm of which is swung into and out of the path of the firing-plate when the slide is shifted, said lower arm of the lever having an auxiliary shoulder for engagement with the firing-plate to prevent the firing of the second barrel.

10. The combination with locks provided with sears, of a trigger, a firing-plate, a reversing-lever, a movable actuating member, and means embracing laterally-acting cam-surfaces on said actuating member for giving movement to the reversing-lever through the shifting of the actuating member.

11. The combination with locks provided with sears, of a trigger, a firing-plate provided with flanges, a reversing-lever pivoted to the firing-plate, and means for actuating said lever comprising cam-surfaces located on the side edges of the said reversing-lever one at the rear and the other forward of the pivot of the lever, and a slide on the frame adapted to act on said cam-surfaces.

In testimony that I claim the foregoing as my invention I affix my signature, in presence of two witnesses, this 29th day of November, A. D. 1901.

ALLAN EDWARD LARD.

Witnesses:
JOHN W. PETERSON,
HERSCHEL BARTLETT.